(12) United States Patent
Fritschy

(10) Patent No.: US 7,899,572 B2
(45) Date of Patent: Mar. 1, 2011

(54) METHOD AND DEVICE FOR MEASURING THE GEOMETRY OF A CUTTING EDGE TO BE CHAMFERED

(75) Inventor: Patrick Fritschy, Le Landeron (CH)

(73) Assignee: Rollomatic SA, Le Landeron (CH)

( * ) Notice: Subject to any disclaimer, the term of this patent is extended or adjusted under 35 U.S.C. 154(b) by 231 days.

(21) Appl. No.: 11/989,265

(22) PCT Filed: Jul. 20, 2006

(86) PCT No.: PCT/IB2006/052488
§ 371 (c)(1),
(2), (4) Date: Jan. 23, 2008

(87) PCT Pub. No.: WO2007/013005
PCT Pub. Date: Feb. 1, 2007

(65) Prior Publication Data
US 2009/0157217 A1    Jun. 18, 2009

(30) Foreign Application Priority Data
Jul. 25, 2005 (EP) .................................. 05405454

(51) Int. Cl.
| | |
|---|---|
| G06F 19/00 | (2006.01) |
| B24B 49/00 | (2006.01) |
| B24B 51/00 | (2006.01) |
| B24B 19/00 | (2006.01) |
| B23F 19/00 | (2006.01) |
| B23D 1/00 | (2006.01) |
| B23D 3/00 | (2006.01) |
| B23D 5/00 | (2006.01) |
| B26D 3/02 | (2006.01) |
| B23B 25/00 | (2006.01) |

(52) U.S. Cl. ............... 700/164; 700/192; 451/5; 451/6; 451/376; 409/8; 409/303; 83/869; 29/28

(58) Field of Classification Search .................. 700/95, 700/117, 159, 160, 164, 192; 451/5, 6, 8, 451/9, 11, 56, 64–66, 69, 71, 367, 374–376, 451/380; 409/8, 12, 303; 83/869; 29/27 R, 29/28, 557, 895.3, 895.31
See application file for complete search history.

(56) References Cited

U.S. PATENT DOCUMENTS
3,680,268 A * 8/1972 Lorton ....................... 451/380

(Continued)

FOREIGN PATENT DOCUMENTS
FR    2691662 A1 * 12/1993

(Continued)

Primary Examiner—Crystal J Barnes-Bullock
(74) Attorney, Agent, or Firm—Clifford W. Browning; Krieg DeVault LLP

(57) ABSTRACT

The machining of drills (1) includes an operation for chamfering the cutting edges (8) performed in two steps. In the first step the rotating grindstone (15) is directed to various locations of the cutting edge (8) and the point of contact is detected by an electronic appliance (17) whereof the electronic module (19) controls the stoppage of the grindstone, its return to the starting position and the recording of the position of the grindstone at the time of contact. In the second step the grindstone (15) is controlled to follow the left line obtained by connecting the points registered during the first step.

5 Claims, 3 Drawing Sheets

U.S. PATENT DOCUMENTS

| | | | | |
|---|---|---|---|---|
| 4,149,304 | A | * | 4/1979 | Brynjegard ................ 29/895.3 |
| 4,371,942 | A | * | 2/1983 | Damikolas ................ 700/192 |
| 4,489,522 | A | | 12/1984 | Henseleit et al. |
| 4,489,523 | A | | 12/1984 | Webster et al. |
| 4,528,780 | A | * | 7/1985 | Halberschmidt et al. ...... 451/14 |
| 4,640,057 | A | * | 2/1987 | Salje ............................ 451/5 |
| 4,648,210 | A | * | 3/1987 | Reinmold et al. ............. 451/11 |
| 4,704,825 | A | * | 11/1987 | Moore ............................ 451/5 |
| 4,723,376 | A | * | 2/1988 | Blum et al. .................... 451/6 |
| 4,897,967 | A | * | 2/1990 | Maruyama et al. ............. 451/5 |
| 5,184,428 | A | * | 2/1993 | Feldt et al. .................... 451/9 |
| 5,333,112 | A | * | 7/1994 | Bybee ........................ 700/164 |
| 5,335,454 | A | * | 8/1994 | Ilek et al. ...................... 451/9 |
| 5,472,371 | A | * | 12/1995 | Yamakura et al. ............. 451/56 |
| 5,556,321 | A | * | 9/1996 | Kasahara et al. ................ 451/5 |
| 5,558,560 | A | * | 9/1996 | Uchida ........................ 451/24 |
| 5,618,993 | A | * | 4/1997 | Matsumoto et al. ........... 73/587 |
| 5,658,189 | A | * | 8/1997 | Kagamida .................... 451/66 |
| 6,080,039 | A | * | 6/2000 | Bartlett et al. ................. 451/9 |
| 6,325,697 | B1 | * | 12/2001 | Gottschalk .................... 451/5 |
| 6,942,542 | B2 | * | 9/2005 | Shibata ......................... 451/5 |
| 6,949,005 | B1 | * | 9/2005 | Larsen et al. .................. 451/5 |
| 7,377,731 | B1 | * | 5/2008 | Arvin .......................... 409/12 |
| 7,533,453 | B2 | * | 5/2009 | Yancy .......................... 29/557 |
| 7,769,483 | B2 | * | 8/2010 | Kubota et al. ............... 700/164 |
| 2003/0053873 | A1 | | 3/2003 | Shaffer |

FOREIGN PATENT DOCUMENTS

| | | | | |
|---|---|---|---|---|
| JP | 63144935 | A | * | 6/1988 |
| JP | 04189458 | A | * | 7/1992 |
| JP | 05016059 | A | * | 1/1993 |
| JP | 06008138 | A | * | 1/1994 |
| JP | 06091530 | A | * | 4/1994 |
| JP | 11320363 | A | * | 11/1999 |

* cited by examiner

METHOD AND DEVICE FOR MEASURING THE GEOMETRY OF A CUTTING EDGE TO BE CHAMFERED

This application claims the benefits under 35 U.S.C. 119 (a)-(d) or (b), or 365(b) of International Application No. PCT/IB2006/052488 filed Jul. 20, 2006, and European Patent Application No. 05405454.9 filed Jul. 25, 2005.

STATE OF THE ART

Cutting tools such as drills, endmills, in particular ballnose endmills, certain chisels, etc. must satisfy ever increasing requirements as regards their performance in terms of accuracy, cutting quality, speed and durability. In certain cases, in particular those of drills, the cutting edge extends along a curve defined in space by the junction of two surfaces forming between them a fairly acute dihedral angle. These tools are generally machined by grinding on CNC machines. After machining, the cutting edge appears as a very finely sharpened line so that immediately from the start of use the risk of nicking is high, which constitutes a risk of early wear. Moreover, as the cutting edge quickly becomes irregular, this is prejudicial to the quality of parts machined by these tools. This is why it is common to regrind the end of the cutting edge by grinding a protective chamfer.

In the case of drills in particular, the cutting edge is a three-dimensional curve of complex shape. It is of course possible to obtain the shape of this curve by calculation. However, in practice, its actual shape differs substantially from the calculated theoretical curve, in particular owing to inaccuracies of the grinding operations on the sides of the threads of the tool. This is why the exact shape of this curve is in practice determined physically just before the chamfering operation. Determining the shape of this curve is generally performed by means of a probing blade connected to a switch and mounted on the drive support of the grinding wheel, close to the axis of the latter. This blade is brought close to the edge of the tool at various places so as to read a series of contact points which are recorded (in general between 30 and 50 measurements are made), after which the grinding wheel is controlled according to the coordinates of the points read so as to regrind the cutting edge by grinding the protective chamfer, an operation referred to as chamfering the edge.

This way of proceeding has however been revealed to be unsatisfactory through its lack of accuracy, due in particular to the errors generated by the probing blade itself and its movement, and by the complications it brings about.

SUMMARY OF THE INVENTION

The aim of the present invention is to propose a method more efficient than the means known up to now for obtaining regular cutting edges with a chamfer of determined width and angle and of lasting quality.

With this aim, the present invention concerns a method of measuring the geometry of a cutting edge of a tool with a view to chamfering this edge by an automatically controlled grinding operation, said method comprising the detection and recording of the positions of neighbouring points along the edge so as to allow programmed control of the movements of the grinding wheel along said edge, characterised in that a contact detector is associated with the grinding wheel, in that the latter, whilst rotating, is first moved in the direction of the edge along lines cutting the edge at said neighbouring points, the detector stopping the movement as soon as contact is detected and the positions reached being recorded, and in that said grinding wheel is then controlled according to the recordings of said positions in order to perform the chamfering of the edge.

The present invention also concerns a device for implementing said method, said device comprising, on a CNC grinding machine equipped for machining tool cutting edges, a grinding wheel support with an associated contact detector and recording and control means for performing, in a first step, probing by the rotating grinding wheel of a series of points along a cutting edge of the tool and recording of the positions of the grinding wheel corresponding to the contact points probed and then, in a second step, control of the grinding wheel so as to chamfer the cutting edge according to the positions probed.

The present invention also concerns a tool, in particular a drill, obtained by said method.

BRIEF DESCRIPTION OF THE DRAWINGS

A description is given below, by way of example, of one embodiment of the method for chamfering the cutting edge of a drill, referring to the accompanying drawings in which.

DETAILED DESCRIPTION OF THE PREFERRED EMBODIMENTS

Figure 1:
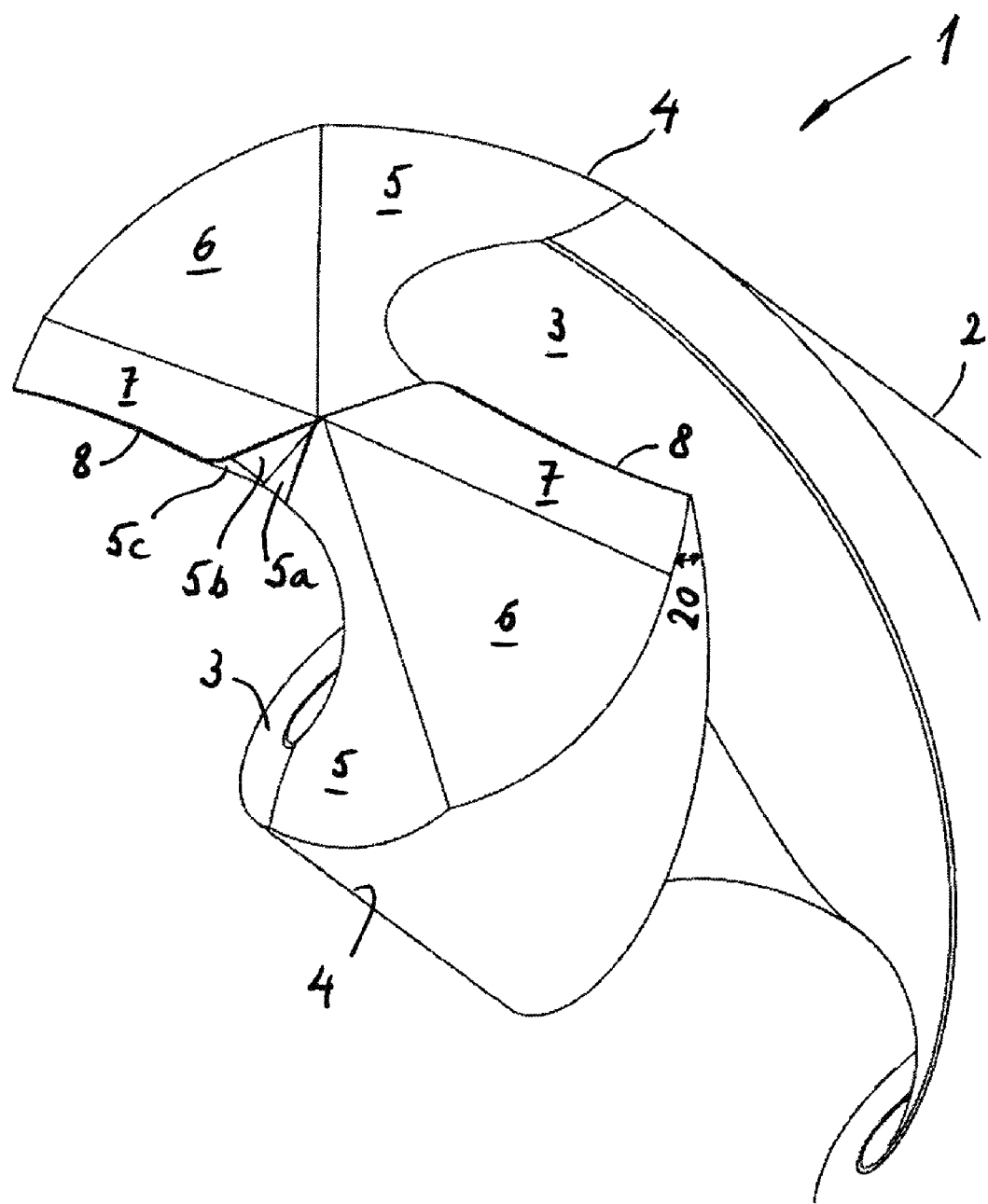
FIG. 1 is a perspective view on a large scale of the cutting parts of the end of the drill.
Figure 2:
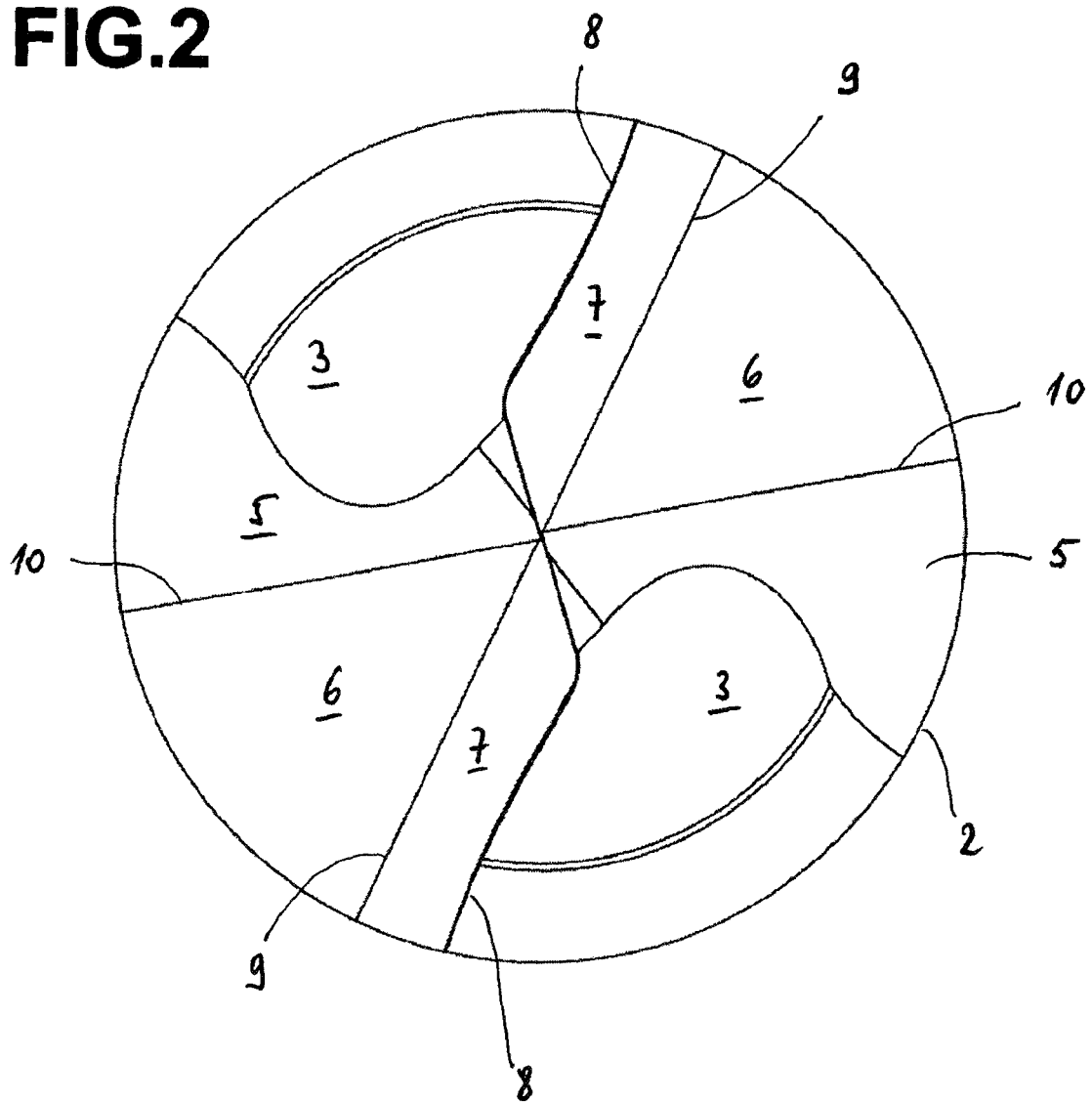
FIG. 2 is an end view of the end of the drill of FIG. 1.

FIGS. 1 and 2 show details of the shape of a drill 1, intended for example for drilling tough steels. It has a cylindrical lateral face 2 in which there are made two diametrically opposite helical grooves 3, extending to the active end of the tool. These grooves determine between them two threads 4 whereof the width in the axial direction is constant as far as the vicinity of the active end of the tool, but decreases in stages on approaching the tip through the presence of three successive ramps 5, 6, 7 made on the rear side of the threads 4. The last ramp 7 joins the front side of the thread along a three-dimensional edge line 8 described in detail later. The slopes and lengths of the ramps 5, 6, 7 are determined according to the performance desired for the drill. In fact as can be seen in FIG. 2, the two edges 9 that separate each ramp 7 from the adjacent ramp 6 are straight, diametrically opposite and determine in the diametral plane of the drill an obtuse angle characteristic of the tool. The same applies for the two edges 10 between the ramps 5 and 6.

As regards the edges 8 limiting the ramps 7, it can be seen that they extend along lines in 3D space from the tip of the drill to the cylindrical side 2 requiring the presence of auxiliary ramps 5a, 5b, 5c between each ramp 5 and the opposite ramp 7. The path of each of the edge lines 8 is therefore complex. It results from the junction of three-dimensional surfaces making between them an acute dihedral angle 20, so that these lines are very sharp and have a high risk of becoming ragged in service.

Figure 3:
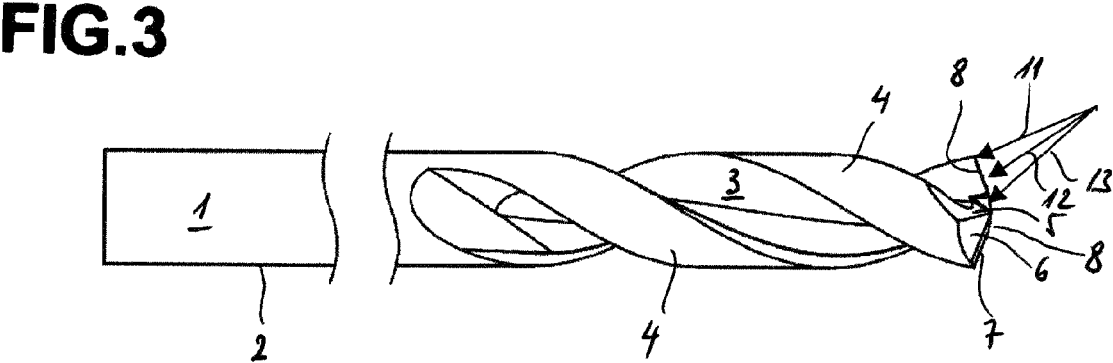
FIG. 3 is a side elevation view of the drill showing the positions of the probing point.
Figure 4:
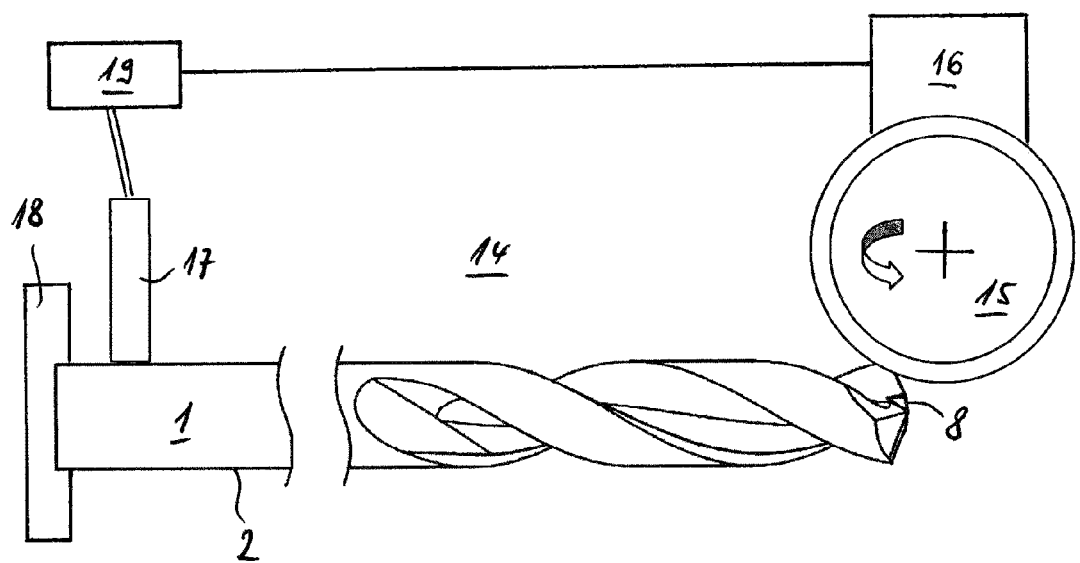
FIG. 4 is a schematic view showing the main elements of the machining device allowing implementation of the method.

To avoid this drawback there is provided, during the machining of drills, a supplementary operation of chamfering the lines 8 whereof a first step, of probing, consists of determining and recording the exact positions of a number of points, for example between thirty and fifty, distributed along the edge lines 8. Thus FIG. 3 shows schematically the positions of three points 11, 12, 13 spaced out along the edge 8 and whereof the coordinates are measured and recorded.

This operation is performed on the CNC machine 14 for grinding the tools using the grinding wheel 15 mounted on its support 16. A drill 1 with its edge to be chamfered is fixed in the work holder 18 of the machine, in a position that is fixed or capable of being moved rotationally. A contact detector 17, which in the example described is an electronic ultrasonic detector, is placed in a suitable position close to the drill, after which the grinding wheel 16 is controlled whilst rotating so as to approach the edge line 8 in different directions as shown in FIG. 3. As soon as contact takes place, the detector 17 records in the electronic device 19 the position of the grinding wheel and controls the withdrawal thereof. Thus the path of the curve 8 in space is established and then nothing more remains but to command the grinding wheel to follow it as recorded in order to perform the chamfering operation. A very narrow but regular final surface is thus formed on the end of each of the threads 4. This surface extends continuously since it is produced by a numerically controlled grinding operation from the tip of the tool, the point of contact of the ramps 5, 6, 7, between the ramps 7 on the one hand and the ramps 5b, 5c, and the front side of the thread 4 determined by the groove 3 on the other hand, to the cylindrical lateral face 2 of the shank of the tool.

Determining the shape of the cutting edge by probing by means of the rotating grinding wheel which itself then performs the chamfering is particularly advantageous compared with the traditional method using a probing blade. This is because, during the probing, the grinding wheel comes into contact with the cutting edge at the same points as when it is next going to perform the chamfering. This eliminates machine calibration errors. Moreover, since the grinding wheel necessarily has to already be rotating during the probing, eccentricity of the grinding wheel is taken into consideration.

The experiments performed with this method showed that the drills are produced more quickly than up until then, that their accuracy and durability are superior and that production costs are brought down.

The same advantages are also obtained with drills of different sizes or with a larger number of flutes and with other types of tool, such as endmills, chisels, reamers, etc.

For detecting the contact of the grinding wheel with the cutting edge, various types of detector can be provided, capable of detecting the vibrations or ultrasounds generated by the contact of the rotating grinding wheel with the cutting edge. Besides the ultrasonic detector depicted, piezoelectric or Foucault current detectors also make it possible to perform the sensing operation described.

The invention claimed is:

1. Method for chamfering the cutting edge of a tool by an automatically controlled grinding operation, said method comprising detection and recording of the positions of neighbouring points along the edge so as to allow programmed control of the movements of the grinding wheel along said edge, wherein a contact detector is associated with the grinding wheel, and wherein the grinding wheel, whilst rotating, is first moved in the direction of the edge along lines cutting the edge at said neighbouring points, the contact detector recording in an electronic device the position of the grinding wheel and controlling the withdrawal of the grinding wheel as soon as contact takes place, and wherein said grinding wheel is then controlled according to the recordings of said positions in order to perform the chamfering of the edge.

2. Device for chamfering the cutting edge of a tool, comprising, on a CNC grinding machine equipped for machining tool cutting edges, a grinding wheel support with an associated contact detector and recording and control means for performing, in a first step, probing by the rotating grinding wheel of a series of points along a cutting edge of the tool, recording of the positions of the grinding wheel corresponding to the contact points probed and controlling the withdrawal of the grinding wheel as soon as contact between said grinding wheel and said cutting edge takes place, and then, in a second step, control of the grinding wheel so as to chamfer the cutting edge according to the positions probed.

3. Device according to claim 2, wherein the contact detector is an ultrasonic detector placed in proximity to a shank of the tool.

4. Device according to claim 2, wherein the contact detector is a Foucault current sensor.

5. Device according to claim 2, wherein the contact detector is a piezoelectric sensor.

* * * * *